J. BART.
LINE HOLDER.
APPLICATION FILED JUNE 7, 1909.
966,297.
Patented Aug. 2, 1910.
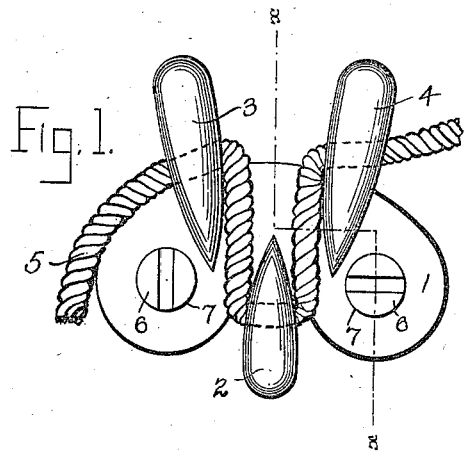
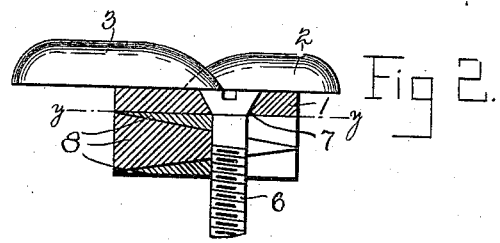
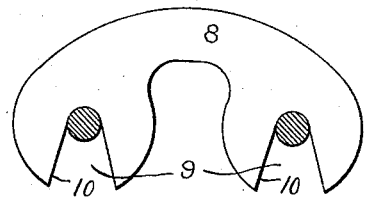
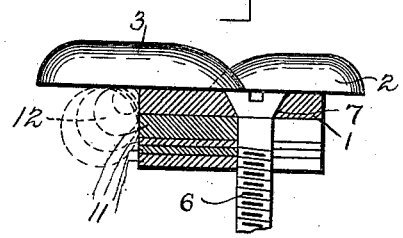
WITNESSES
INVENTOR
Joseph Bart
By his Attorneys.

UNITED STATES PATENT OFFICE.

JOSEPH BART, OF NEW YORK, N. Y.

LINE-HOLDER.

966,297.  Specification of Letters Patent.  Patented Aug. 2, 1910.

Application filed June 7, 1909. Serial No. 500,469.

*To all whom it may concern:*

Be it known that I, JOSEPH BART, a citizen of the United States, residing at New York, in the county of New York and State of New York, have invented certain new and useful Improvements in Line-Holders; and I do hereby declare the following to be a full, clear, and exact description of the invention, such as will enable others skilled in the art to which it appertains to make and use the same.

My invention relates to line holders or fasteners, sometimes designated rope clutches, for gripping a line or rope when it is desired to secure the same against slipping or working loose. It will be understood that a rope or line may be securely fastened at any point intermediate of its ends to this device.

The principal object of this invention is to provide for adjusting the clutch or holder at various distances from the surface to which it is secured whereby different sizes of ropes or lines may be accommodated and fastened by means of the holder.

Other objects will become apparent from the following description.

The invention consists of the combination, with a line holder having means for gripping a rope or line, of a plurality of interchangeable inserts or plates adapted to be arranged between the holder and the surface to which it is attached, and to be secured in place by the same means which fastens said holder.

The invention also consists of the features of construction and combinations of parts hereinafter described and specified in the claims.

The accompanying drawing illustrates the preferred embodiment of my invention.

Figure 1 is a plan view of a holder constructed in accordance with my invention. Fig. 2 is a sectional view on the line *x—x* of Fig. 1. Fig. 3 is a sectional view on the line *y—y* of Fig. 2, and Fig. 4 is a view similar to Fig. 2 but showing a modified construction in which flat instead of wedge-shaped inserts are used.

Referring first to Figs. 1 to 3, inclusive, of the drawing, the line holder proper consists of a flat, preferably arcuate, plate 1, from the upper surface of which three lugs or horns 2, 3 and 4, respectively, project so that their under faces are straight and arranged in the same plane with the top surface of said plate. The lug 2 is located at the middle of the concave edge of the plate, and the lugs 3 and 4 on the convex edge of said plate at equal distances at opposite sides of the lug 2, whereby the line or rope 5 may be passed successively below the lugs 3, 2 and 4, as usual, and as illustrated in Fig. 1. The plate 1 is secured in position by means of two screws or bolts 6 which are passed through openings 7, one of which is preferably arranged near each end of said plate. In order to provide for the use of the line holder for securing lines or ropes of various sizes or diameters, I use a plurality of inserts 8, which preferably conform to the shape of the plate 1 of said holder. These inserts, as illustrated in Fig. 2, are wedge-shaped in cross-section. It will be understood, of course, that any number of these inserts may be used according to the distance it is desired to raise the holder from the surface to which it is secured by the screws 6. Each of these inserts has open slots 9 in each of its ends, the inner extremity of said slots being in alinement with the openings 7 in the plate 1 when said inserts are themselves brought into alinement with said plate. The walls of the grooves 9 are preferably flared, as at 10, to readily guide the inserts into proper position with said slots engaging the screws 6 when the inserts are introduced below the holder.

In Fig. 4, 11 designates flat inserts of varying thicknesses which may be used in lieu of the wedge-shaped inserts. The number and thickness of the inserts, whether flat or wedge-shaped, may be varied to accommodate the size of the line or rope to be secured to the holder in each particular case. I have also illustrated at 12 in Fig. 4 how the number and thickness of the inserts may be determined by the size of the line or rope.

The manner of making an adjustment is very simple. It is only necessary to loosen the screws or bolts 6, introduce or remove one or more of the inserts, those which are introduced being arrested in proper position by the inner extremities of their slots coming in contact with said screws or bolts, and finally tightening said screws or bolts thereby rigidly securing the holder and inserts.

I claim:

1. A line holder comprising an arcuate flat plate having a single projecting lug arranged at the middle of its concave edge and two spaced apart lugs at its convex edge the under faces of all of said lugs being arranged in the plane of the top of said plate.

2. The combination, with a line holder comprising a plate having a single projecting lug at one edge and two spaced apart lugs at its opposite edge, the under faces of all of said lugs being arranged in the plane of the top of said plate, of a plurality of interchangeable inserts, and means for securing said inserts in position.

3. The combination, with a line holder comprising a plate having projecting lugs, of a plurality of interchangeable inserts, and means for fastening said plate in position which also secures said inserts.

In testimony whereof, I affix my signature, in presence of two witnesses.

JOSEPH BART.

Witnesses:
  JOHN MACGREGOR,
  LEIGH A. ROCCAY.